Dec. 4, 1934. R. SCHÖNFELDER 1,983,313
SULPHUR SEPARATOR
Filed Jan. 10, 1929
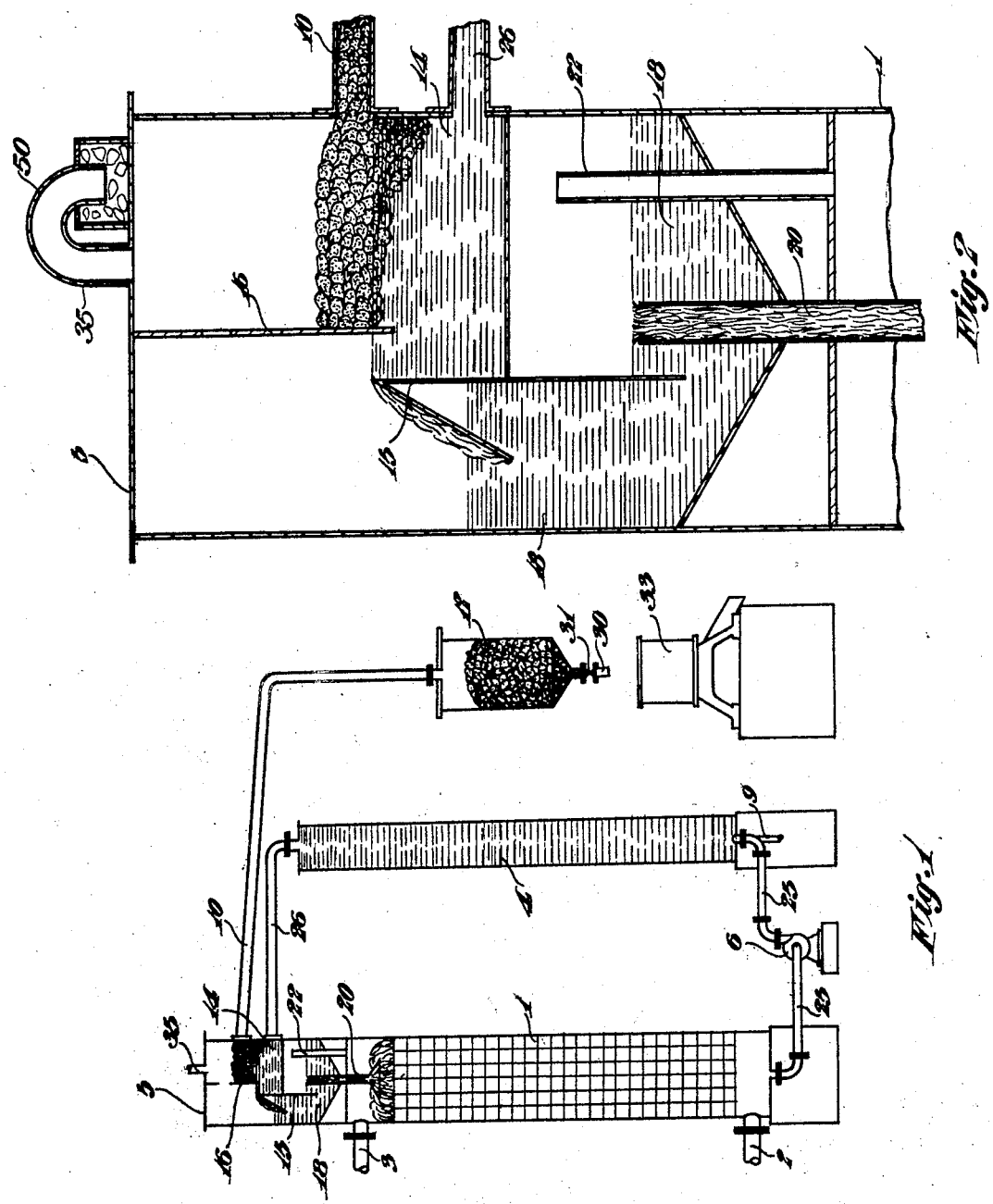
INVENTOR.
Robert Schönfelder
BY Hans Heverich
ATTORNEY.

Patented Dec. 4, 1934

1,983,313

UNITED STATES PATENT OFFICE 1,983,313

SULPHUR SEPARATOR

Robert Schönfelder, Dortmund-Eving, Germany

Application January 10, 1929, Serial No. 331,571
In Germany January 19, 1928

10 Claims. (Cl. 210—51)

My invention relates to apparatus for purifying gases such as fuel gas, air or other gases, from sulphur impurities, such as hydrogen sulphide, and from analogous acidic impurities, such as hydrogen cyanide.

That portion of the apparatus hereinbelow set forth and illustrated in Figs. 1 and 2 of the accompanying drawing forms the subject matter of my application for German Letters Patent Serial No. G-72294, VI/26d. filed in Germany on January 17, 1928.

There are a number of known processes of the cyclic type in which an absorbent liquid is continuously recirculated over the flowing gas to be purified and through an actification or regeneration stage in which the reactivity of the solution is renewed by aeration or other suitable means.

Suspensions of iron oxide may be used for desulphurizing gas, the iron oxide reacting with hydrogen sulphide in the gas with the formation of iron sulphide. By treatment with oxygen or oxygen containing gases, the solution used for sulphur removal may then be regenerated, the iron sulphide being reconverted to iron oxide with liberation of sulphur in elementary form. By maintaining definite conditions it is possible to separate the sulphur in the form of a foam floating on the solution, which may then be passed in a separator through an overflow into a special receiver, and in this manner may be separated from the solution. The regenerated solution is then recirculated in the cycle for the purification of further quantities of gas.

In order to carry out this cyclic process it is desirable that the varying gas pressure in the absorber shall not exert any effect upon the liquid level in the separator as separation of the sulphur foam by means of an overflow requires an approximately constant liquid level.

An object of the present invention is an arrangement which solves this problem in an especially suitable manner.

A second object of the present invention is to provide apparatus for purifying gas from sulphur compounds and for separating the sulphur liberated in the process that shall be compact and convenient and so disposed as to avoid excessive pumping of the absorbent liquid.

A further object of the present invention is to provide apparatus of the character hereinabove indicated and including sulphur separating means so disposed as to cause the air or other gas used for regeneration of the liquid to assist in the removal of the separated sulphur foam.

In order that my invention may be clearly set forth and understood, I now describe with reference to the accompanying drawing a preferred embodiment thereof. In the drawing, Fig. 1 is a more or less diagrammatic vertical sectional view of gas purification apparatus embodying the present invention; and Fig. 2 is an enlarged vertical sectional view of a portion of the apparatus shown in Fig. 1, such portion comprising means for separating sulphur foam from the absorbent liquid.

Similar numerals designate similar parts in each of the several views of the drawing.

Referring to the drawing, and more particularly to Figures 1 and 2, the apparatus for gas purification comprises an absorber 1 of the usual type and provided with suitable gas and liquid contact devices, and having a gas inlet 2 and a gas outlet 3. The apparatus also includes an actifier or oxidizing tower 4 and a separating device 5, the latter being mounted upon and forming an extension of the absorber 1.

The hydrogen sulphide in the gas entering at 2 is removed in scrubber 1 by an aqueous suspension of iron oxide flowing in countercurrent to the gas. The solution is pumped by a circulating pump 6 into the oxidizing tower 4 at the bottom of which compressed air is introduced through a pipe 9. The mixture of air and liquid passes up into the separating device 5. There the sulphur separates in the form of a foam on the surface of the liquid and passes through an overflow pipe 10 into a receiver 12.

In order to provide the desired constant liquid level in the separating compartment 14 for a continuous separation of sulphur, the device 5 is provided with separating walls 15 and 16. The separating wall 16 retains the sulphur foam while the liquid passes over the overflow 15 into the separate (reservoir) compartment 18, the liquid level of which, in accordance with the variations in gas pressure, lies so low that even under maximum pressure it does not reach the level in the sulphur separating compartment proper. From this point the liquid passes into the scrubber 1, going through an intervening space between the bottom and the overflow and then through the overflow pipe 20 into the absorber 1.

It is apparent that with variation of gas pressure in the scrubber there will be no effect on the liquid level in the separating chamber 14 as the absorber 1 is not directly connected with the separating chamber 14 except through a liquid seal and the separating compartment 18. By the present invention the execution of a cyclic process is made possible so that sulphur may be separated continuously despite variations of gas pressure in the scrubber.

The overflow pipe 20 is so constructed as to suitably distribute any liquid overflowing in the scrubber 1, and communication is provided between the interior of the absorber 1 and that portion of compartment 18 lying between the top of the overflow pipe 20 and the baffle or separating wall 15 by a pressure equalizing conduit 22.

It will be noted that the baffle or separating wall 16 extends some distance below the upper edge of the separating wall 15.

The solution or the mixture of liquid, air, and sulphur foam, as the case may be, is recirculated between the absorber 1 and the oxidizing tower 4 through pipes 25 and 26, as shown in Fig. 1, under action of the pump 6.

The sulphur foam collecting in the receiver 12 may be removed if desired through a drain 30 having a valve 31 and may be introduced directly into a centrifuge 33 for drying.

In the apparatus shown in Figure 2 a gas vent 35 is provided in the top of the separating device 5 for the escape of the oxidizing medium such as air or other oxygen-containing gas originally introduced through the pipe 9.

In the modification shown in Figure 2 the air or other oxygen-containing gas introduced through the pipe 9 after passing through the oxidizing tower 4 and the pipe 26 into the separating compartment 14 and there separated from the liquid is not permitted to escape into the atmosphere immediately as in the previous instance. The separating compartment 14 is in this instance provided with a sealed gas outlet pipe 50, so constructed as to prevent the escape of gas therethrough under normal conditions, the seal being arranged to blow only under extraordinary pressures.

Thus the air separated from the absorbent liquid in the separating compartment 14 finds its sole means of egress from the separating compartment 5 in the conduit 10, which also serves to convey sulphur foam from the separating compartment 14 to the receiver 12, and the air in passing through this conduit serves as an effective means for removing the sulphur foam from the separating compartment 14 to the receiver 12. The air then escapes from the foam through a vent 51 in the top of the receiver 12.

While my invention has hereinabove been described with respect to the use of a particular absorbent liquid, namely, a suspension of iron oxide in water or any alkaline solution, it will be obvious that my invention is not limited to such use, for it may be employed with equally good results when other gas purification liquids are employed, and whether these consist of solutions or suspensions. However, my invention is particularly intended for use in processes of the so-called "sulphur recovery" type, i. e. in which the sulphur removed from the gas is eventually converted to sulphur in elemental form rather than to a gas or soluble compound thereof.

While my invention has been described hereinabove with respect to certain illustrative examples it is not limited to such specific instances but is to be construed within the scope of the claims hereinafter made.

I claim as my invention:

1. A sulphur separator for use in connection with apparatus for purifying gases, such as fuel gas, air, or other gases, from sulphur impurities, such as hydrogen sulphide, said separator comprising, in combination, a vessel, walls dividing its interior into three compartments, of which two are located above one another and the third is located laterally from said two, the upper portion of said third compartment communicating with the upper compartment of the first-mentioned two, and the lower portion of the third compartment communicating with the lower compartment of the first-mentioned two, two pipes extending from the lower of said first mentioned compartments through the bottom of said vessel, the upper end of one of them lying at a higher level than the upper end of the other, there being two lateral apertures communicating with the upper compartment and lying at different levels, substantially as disclosed and for the purpose set forth.

2. A sulphur separator for use in connection with apparatus for purifying gases, such as fuel gas, air, or other gases, from sulphur impurities, such as hydrogen sulphide, said separator comprising, in combination, a vessel, an intermediate horizontal partition extending from a side of said vessel and terminating at a certain distance from the opposite side of the vessel, a vertical wall located at the free edge of said intermediate partition and the upper edge of which terminates at a distance from the top of the vessel and the lower edge of which terminates at a distance from the bottom thereof, a second vertical wall extending from the top of the vessel and terminating at a distance from said partition and at a level below that of the upper edge of the other wall, the upper rim of said second wall and the lower rim of the first wall being spaced to form a sealed passage; two pipes extending from the space below the intermediate partition through the bottom of the vessel, the upper end of one of these pipes lying in a lower plane than the upper end of the other pipe, and in a higher plane than the lower edge of the first-mentioned wall, there being two lateral apertures of which one communicates with the lowermost portion of the compartment located above the intermediate partition, and the other of which communicates with the portion thereabove, substantially as described and for the purpose set forth.

3. A sulphur separator comprising an upper sulphur separating compartment and a lower liquid sealing compartment; conduit feed-means for feeding liquid from the upper compartment to the lower compartment; a liquid discharge conduit and a vent conduit extending from said lower compartment, the upper end of vent conduit lying at higher level than the upper end of the liquid discharge conduit whereby to raise and lower the liquid sealing column in said conduit feed-means in accordance with the pressure in said vent conduit; inlet means for inlet of liquid to said upper sulphur separating compartment; and outlet means for outlet of sulphur from a higher level in said upper compartment.

4. Apparatus as claimed in claim 3 and which also comprises a vent conduit for venting said upper compartment.

5. Apparatus as claimed in claim 3 and which also comprises a vent conduit including a liquid seal therefor for venting said upper compartment.

6. Apparatus as claimed in claim 3 and which also comprises a sulphur baffle located between the inlet and outlet means for the upper compartment and the conduit feed-means therefor, and extending below the level of the top of the conduit feed-means.

7. Apparatus as claimed in claim 3 and which also includes means for equalizing the pressure above the liquid in the upper compartment with the pressure above liquid in the conduit feed-means therefor.

8. In apparatus for separating sulphur: a chamber; a vessel situated above said chamber and having a sulphur-separating compartment and a constant over-flow level compartment, the former located above the latter; a sulphur outlet for said sulphur-separating compartment; outlet means for discharge of liquid from said constant over-flow level compartment to said chamber; and an overflow conduit leading from the sulphur-separating compartment to a point below the level of the liquid in the constant over-flow level compartment and below the upper level of the outlet means therefor.

9. In apparatus for separating sulphur: a chamber; a vessel situated above said chamber and having a sulphur-separating compartment and a constant over-flow level compartment, the former located above the latter; outlet means for discharge of liquid from said constant-level compartment to said chamber, said sulphur- separating compartment having a liquid inlet; a froth outlet located above said inlet; a liquid overflow conduit leading from a level between said inlet and outlet to a point below the level of the liquid in said constant-level compartment; and a froth baffle located between said liquid overflow conduit and said inlet and outlet and extending below the level of the top of said overflow conduit.

10. In apparatus for separating sulphur: a chamber; a vessel situated above said chamber and having a sulphur-separating compartment and a constant over-flow level compartment, the former located above the latter; said sulphur-separating compartment having a liquid inlet, a froth outlet located above said inlet, a liquid overflow conduit leading from a level between said inlet and outlet to a point within said constant-level compartment; a liquid supply conduit leading from a point within said constant-level compartment above the level of the bottom of said liquid overflow conduit to said chamber; and a vent conduit leading from said chamber to a point within said constant-level compartment above the upper end of said liquid supply conduit.

ROBERT SCHÖNFELDER.